US011761406B1

(12) United States Patent
Dudar et al.

(10) Patent No.: US 11,761,406 B1
(45) Date of Patent: Sep. 19, 2023

(54) METHODS AND SYSTEMS FOR CONTROLLING A BELLOWS IN A PRESSURE-LESS FUEL TANK

(71) Applicant: Ford Global Technologies, LLC, Dearborn, MI (US)

(72) Inventors: Aed Dudar, Canton, MI (US); Russell Randall Pearce, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/821,744

(22) Filed: Aug. 23, 2022

(51) Int. Cl.
*F02M 25/08* (2006.01)
*F02D 41/00* (2006.01)
*B60W 20/15* (2016.01)
*B60W 50/02* (2012.01)

(52) U.S. Cl.
CPC ........ *F02M 25/0818* (2013.01); *B60W 20/15* (2016.01); *B60W 50/0205* (2013.01); *B60W 50/0225* (2013.01); *F02D 41/003* (2013.01); *F02M 25/0836* (2013.01); *F02D 2200/06* (2013.01); *F02D 2200/60* (2013.01)

(58) Field of Classification Search
CPC .......... F02M 25/0818; F02M 25/0836; B60W 20/15; B60W 50/0205; B60W 50/0225; F02D 41/003; F02D 2200/06; F02D 2200/60
See application file for complete search history.

(56) References Cited

U.S. PATENT DOCUMENTS

| 6,681,789 | B1 | 1/2004 | Moulis et al. |
| 7,448,367 | B1 | 11/2008 | Reddy et al. |
| 8,019,525 | B2 | 9/2011 | DeBastos et al. |
| 8,074,627 | B2 | 12/2011 | Siddiqui |
| 9,409,570 | B2 | 8/2016 | Pandita et al. |
| 9,777,676 | B2 | 10/2017 | Pursifull et al. |
| 11,274,622 | B1 * | 3/2022 | Dudar ............. F02D 41/22 |
| 11,280,287 | B1 | 3/2022 | Dudar et al. |
| 11,346,308 | B1 * | 5/2022 | Dudar ............. F02M 25/0818 |
| 2011/0139130 | A1 | 6/2011 | Siddiqui |
| 2019/0249622 | A1 | 8/2019 | Dudar et al. |

FOREIGN PATENT DOCUMENTS

WO 2020177767 A1 9/2020

* cited by examiner

*Primary Examiner* — Xiao En Mo
(74) *Attorney, Agent, or Firm* — Vincent Mastrogiacomo; McCoy Russell LLP

(57) ABSTRACT

Methods and systems are provided for adjusting a volume of a variable volume device arranged in a fuel tank. In one example, a method may include, upon conditions being met, operating a pump of an evaporative emissions control (EVAP) system leak detection module (ELCM) to increase or decrease the volume of the variable volume device in response to a refueling event of a vehicle being transported.

20 Claims, 9 Drawing Sheets

METHODS AND SYSTEMS FOR CONTROLLING A BELLOWS IN A PRESSURE-LESS FUEL TANK

FIELD

The present description relates generally to methods and systems actuating a bellows included in a pressure-less fuel tank.

BACKGROUND/SUMMARY

Vehicles, such as plug-in hybrid electric vehicles (PHEVs), may include a fuel system in which a fuel tank may be fluidically coupled to a fuel vapor canister of an evaporative emissions control (EVAP) system for storing, filtering, and venting fuel vapors from the fuel tank. The fuel tank may be isolatable from the fuel vapor canister via a fuel tank isolation valve (FTIV) such that only fuel vapors from select events may be present in a given volume (e.g., the fuel tank or the fuel vapor canister). For example, the fuel tank may trap diurnal fuel vapors (that is, from diurnal temperature cycles) and "running loss" fuel vapors (that is, from fuel vaporized during vehicle operation), and the fuel vapor canister may adsorb depressurization fuel vapors (that is, fuel vapors depressurized from the fuel tank to prevent overpressure) and refueling fuel vapors (that is, fuel vapors diverted during refilling of the fuel tank). Further, when a pressure gradient is generated due to a relatively low pressure in either an intake manifold of the vehicle or the fuel tank, fuel vapors may be passively purged from the fuel vapor canister.

Such fuel systems are sometimes referred to as non-integrated refueling canister-only systems (NIRCOSs). To control the various venting and flow paths for the fuel vapors during different modes of vehicle operation, actuation of valve and locking systems (including the FTIV) may be enabled such that no single volume in the NIRCOS is overwhelmed with excess fuel vapor pressure and that any such excess fuel vapor pressure is released. To ensure component reliability in extreme fuel vapor pressure scenarios (e.g., excess fuel vapor pressure or excess vacuum), components of the fuel system may be specially reinforced. For example, the fuel tank may be constructed from heavy steel and may include a number of standoffs supporting opposing walls of the fuel tank. To further mitigate component degradation, depressurization or venting of the fuel tank and/or the fuel vapor canister may be executed on a timescale ranging from a few seconds to a few minutes (e.g., depending on ambient conditions).

However, particularly lengthy depressurization/venting may result in operator frustration or confusion, as the excess fuel vapor pressure needs to be evacuated prior to opening a refueling inlet to the atmosphere. Additionally, the extra hardware used to seal and depressurize the fuel tank adds cost to the system. One approach to reducing the depressurization time and cost is to use a sealed but "pressure-less" fuel tank with a built-in variable volume device (e.g., a bellows) that expands and contracts to relieve vacuum and pressure buildups, thereby eliminating pressurization hardware and reducing costs as shown by Moulis et al. in U.S. Pat. No. 6,681,789.

However, the inventors herein have recognized potential issues with such systems. For instance, during a refueling event with relative low ambient temperatures, the bellows may be more rigid, which may result in a premature shut-off of the refueling nozzle. Thus, it may be desired to control a volume of the bellows during the refueling event along with other events.

In one example, the issues described above may be addressed by a method for operating a pump of an evaporative leak detection module (ELCM) of an evaporative emissions control (EVAP) system to adjust a volume of a bellows within a fuel tank outside of a diagnostic. By doing this, fuel tank conditions may be adjusted by adjusting the volume of the bellows.

For example, the bellows may be actuated via the pump following a refueling event. Engine operation following the refueling event may be activated such that a vehicle is operating in an all-electric mode. Purging may not be available during the all-electric mode and a canister, which may be full of vapors from the refueling event may be prone to leaking vapors. The bellows may be actuated to increase a vacuum generated in a fuel tank during a vehicle descent. The vacuum may be used to draw vapors from the canister into the fuel tank, herein referred to as reverse purging. By doing this, vapor leak to the atmosphere may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
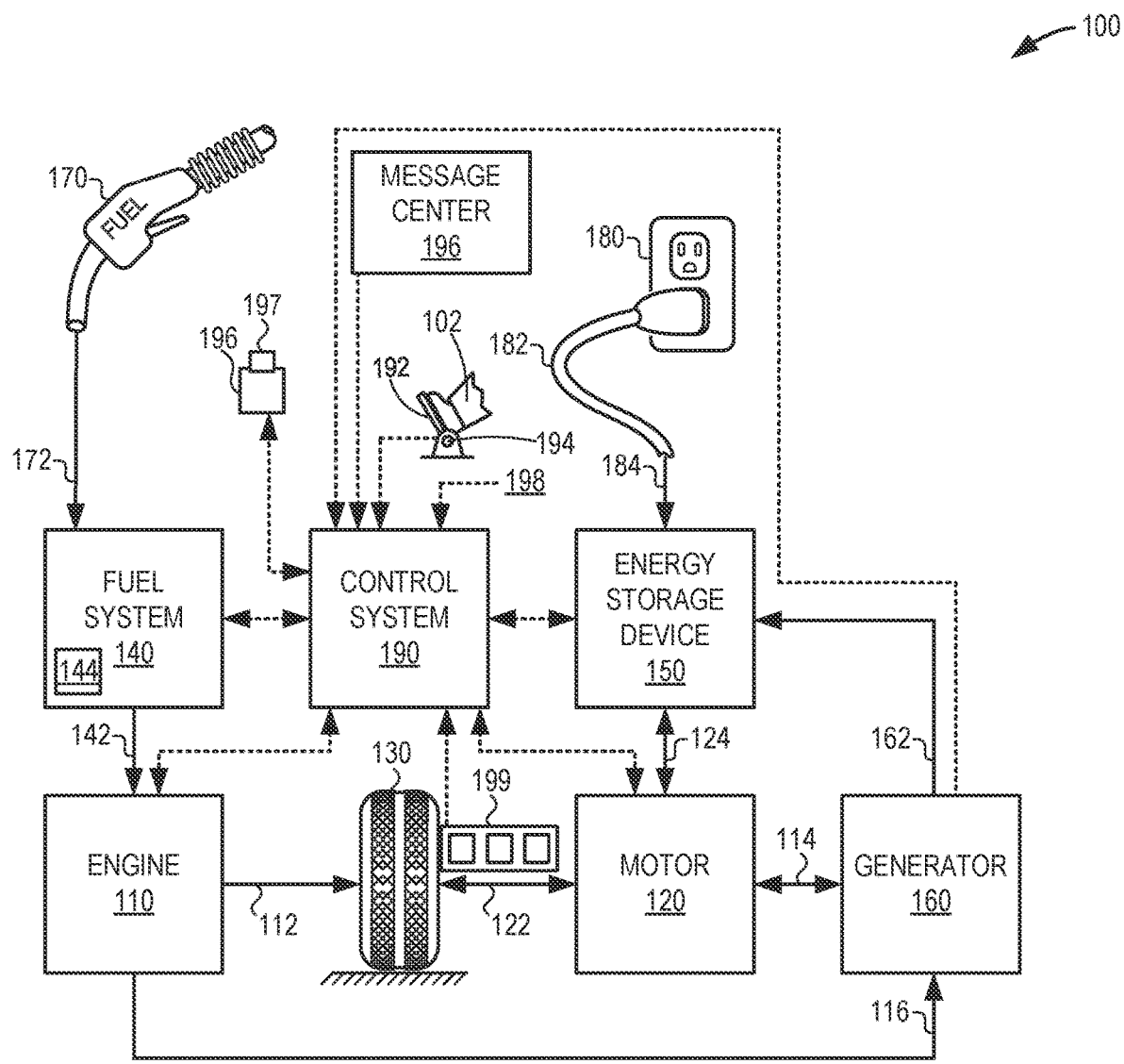
FIG. 1 shows a high-level block diagram illustrating an example vehicle system.
Figure 2:
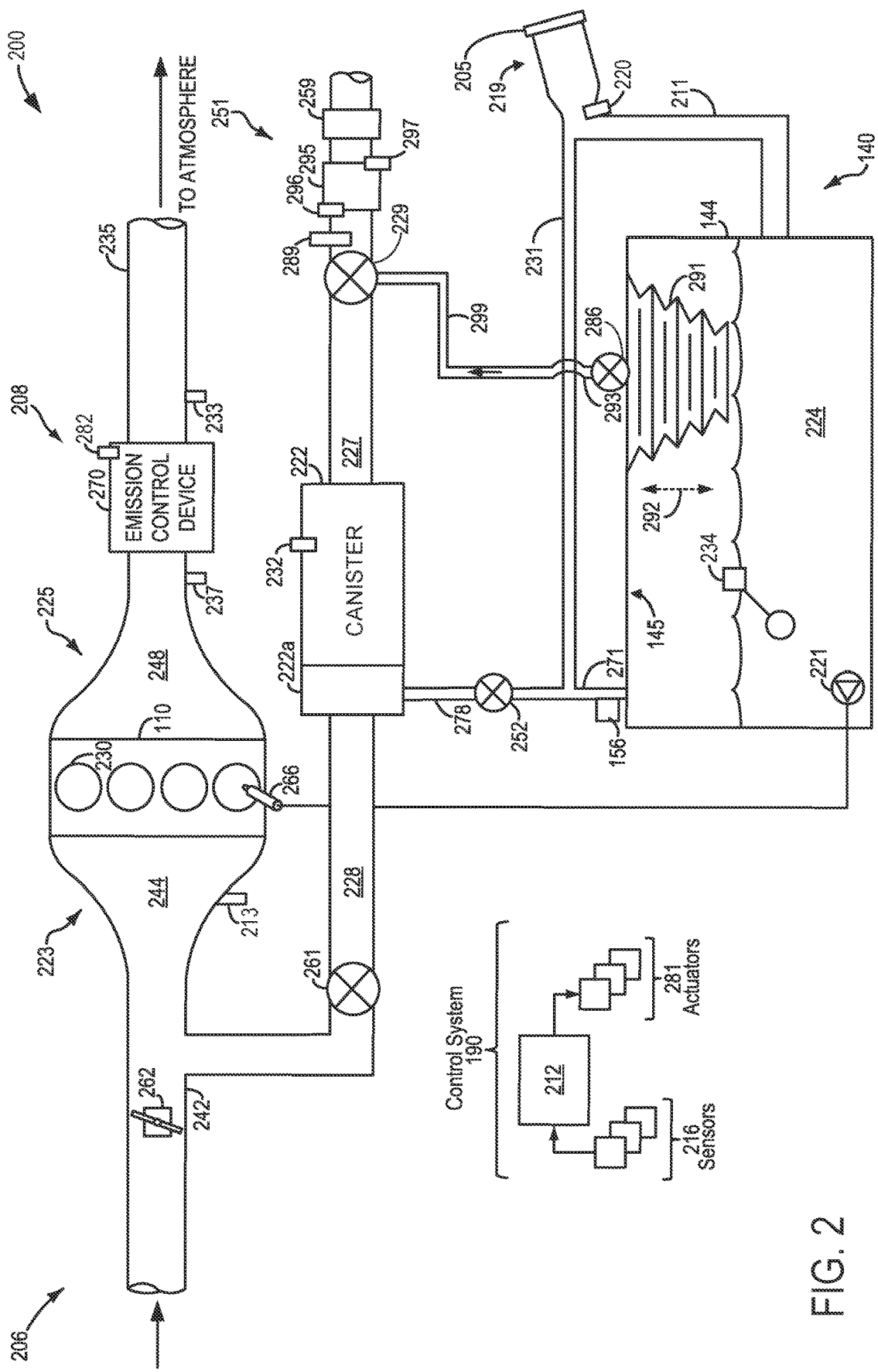
FIG. 2 shows a schematic diagram of a fuel system and an evaporative emissions control system including in the example vehicle system of FIG. 1.
Figure 3B:
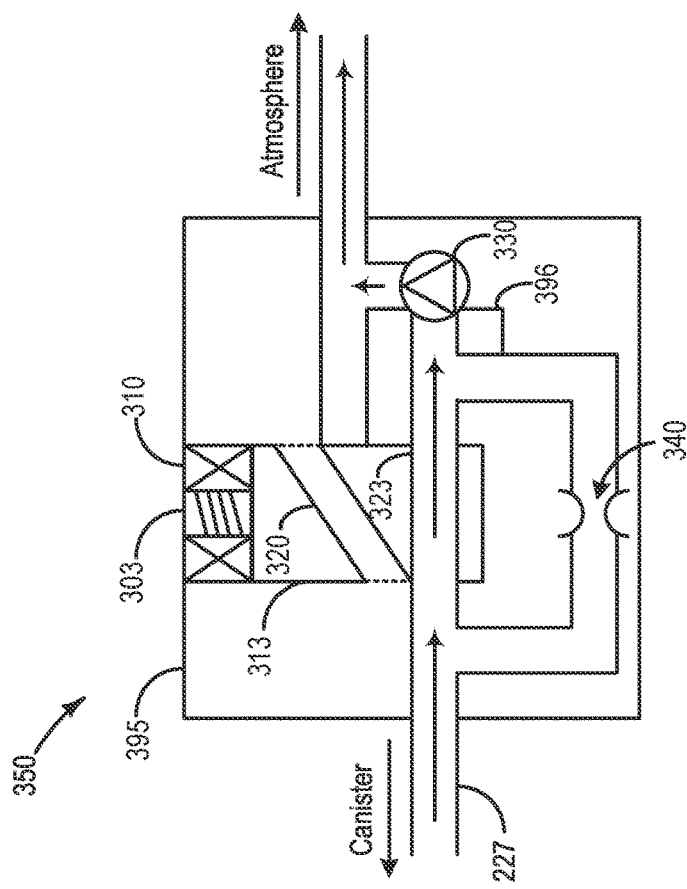
FIG. 3B shows a schematic depiction of an evaporative leak check module in a configuration to apply a vacuum to a bellows included in a fuel tank of the fuel system.
Figure 3A:
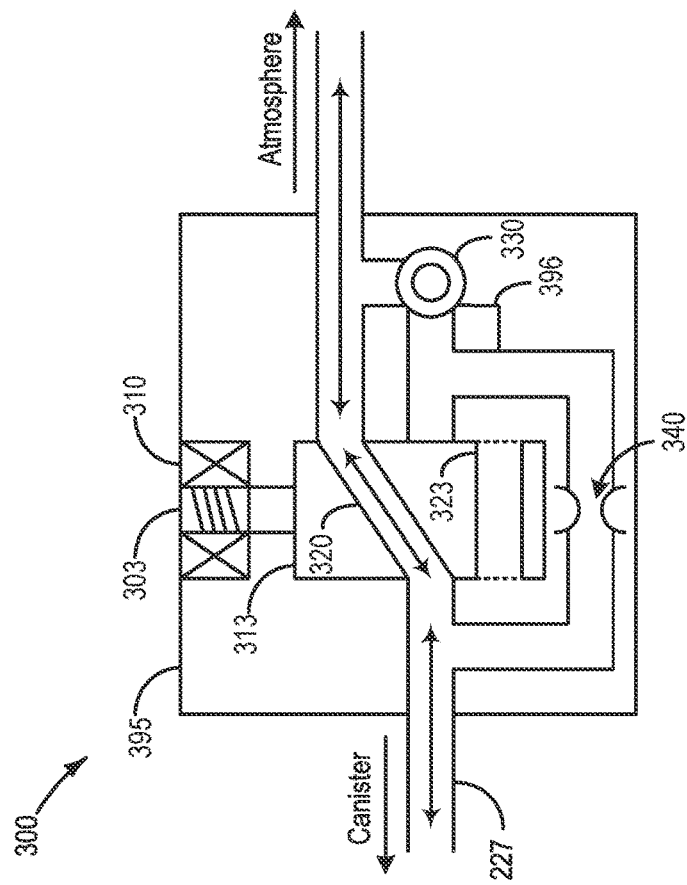
FIG. 3A shows a schematic depiction of the evaporative leak check module in a configuration where a fuel vapor canister is vented to atmosphere.
Figure 4A:
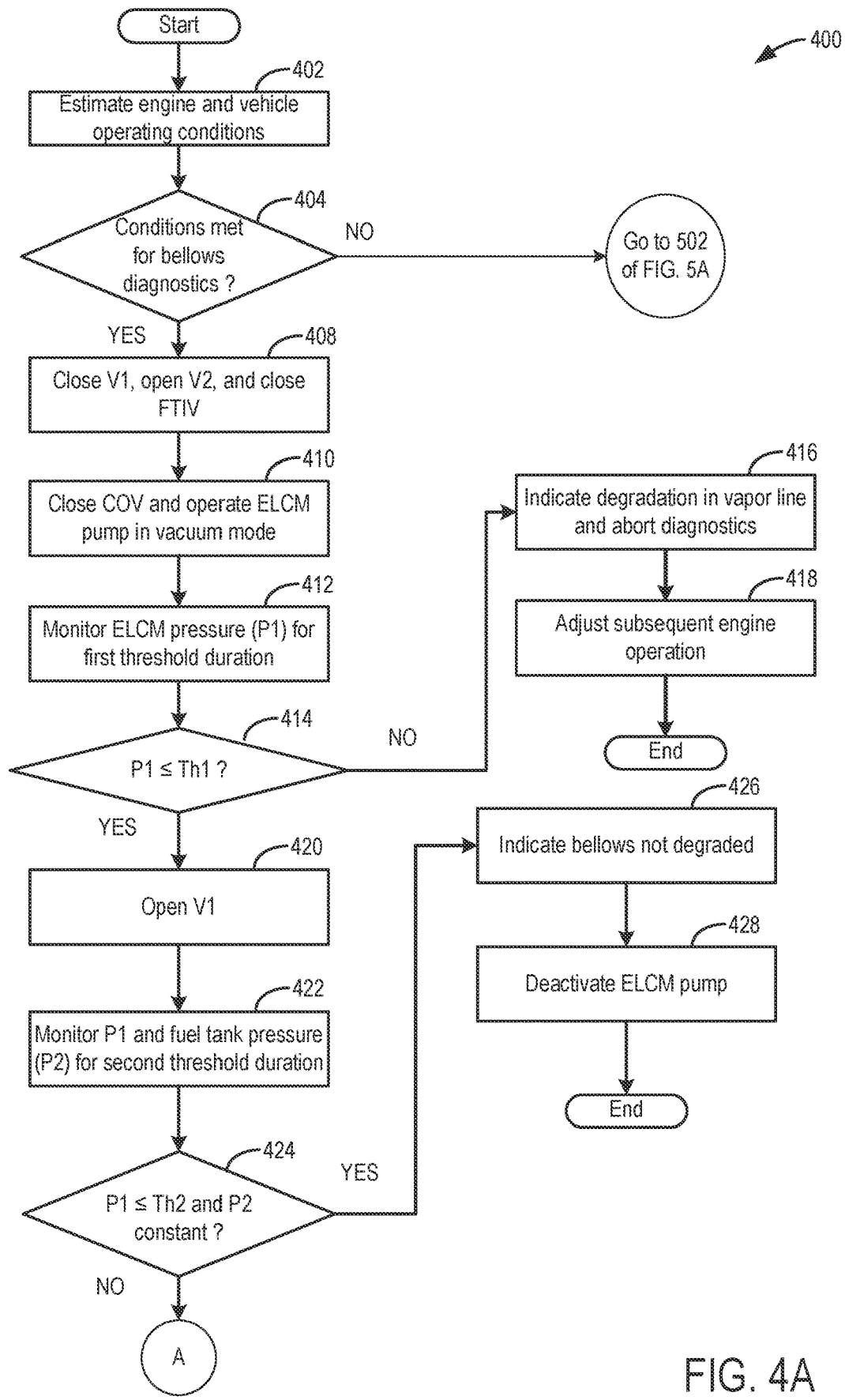
FIG. 4A shows a first part of a high level flow chart of an example method for diagnosing the bellows included in the fuel tank.
Figure 4B:
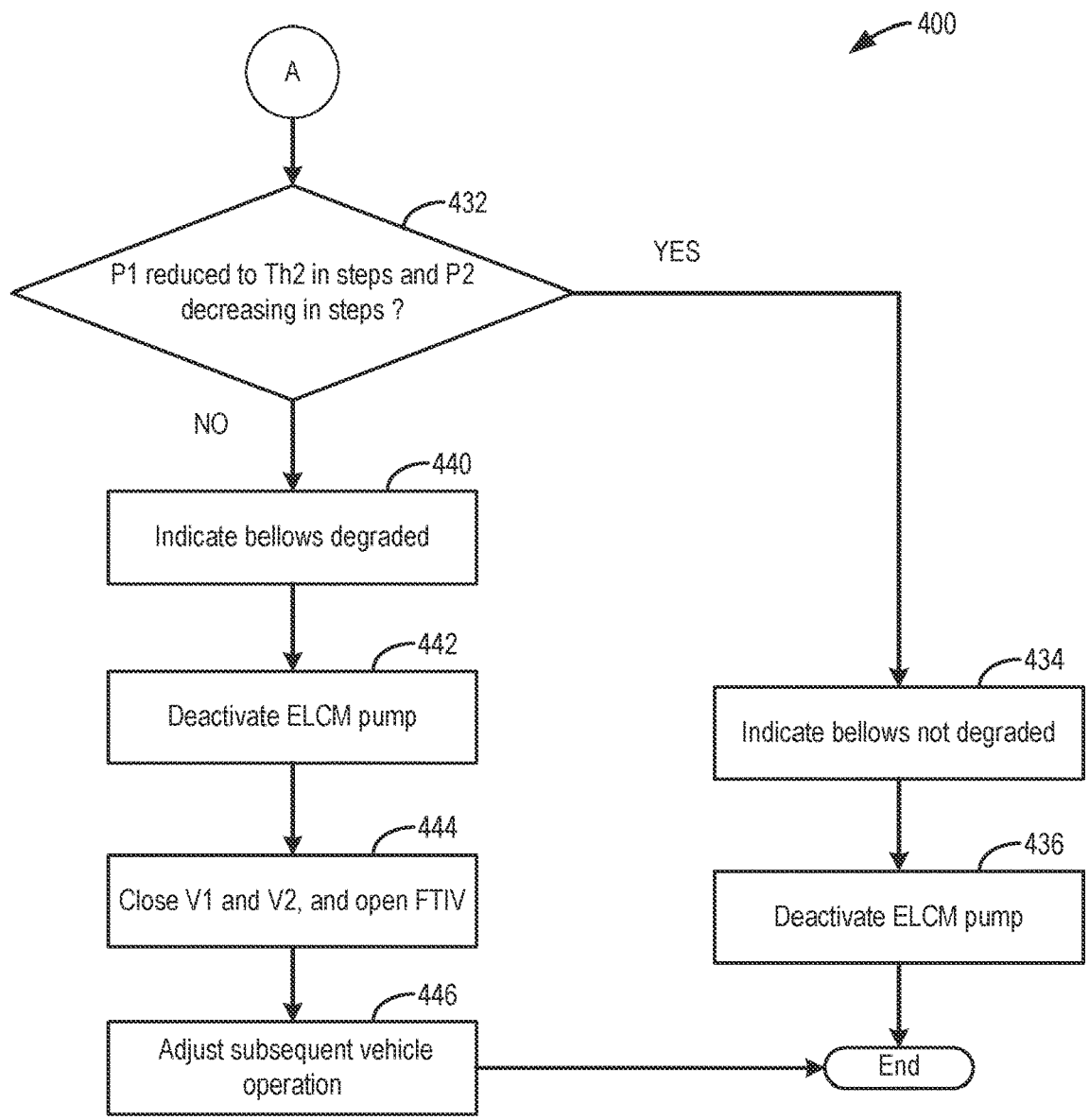
FIG. 4B shows a second part of the high level flow chart of the example method for diagnosing the bellows included in the fuel tank.
Figure 5A:
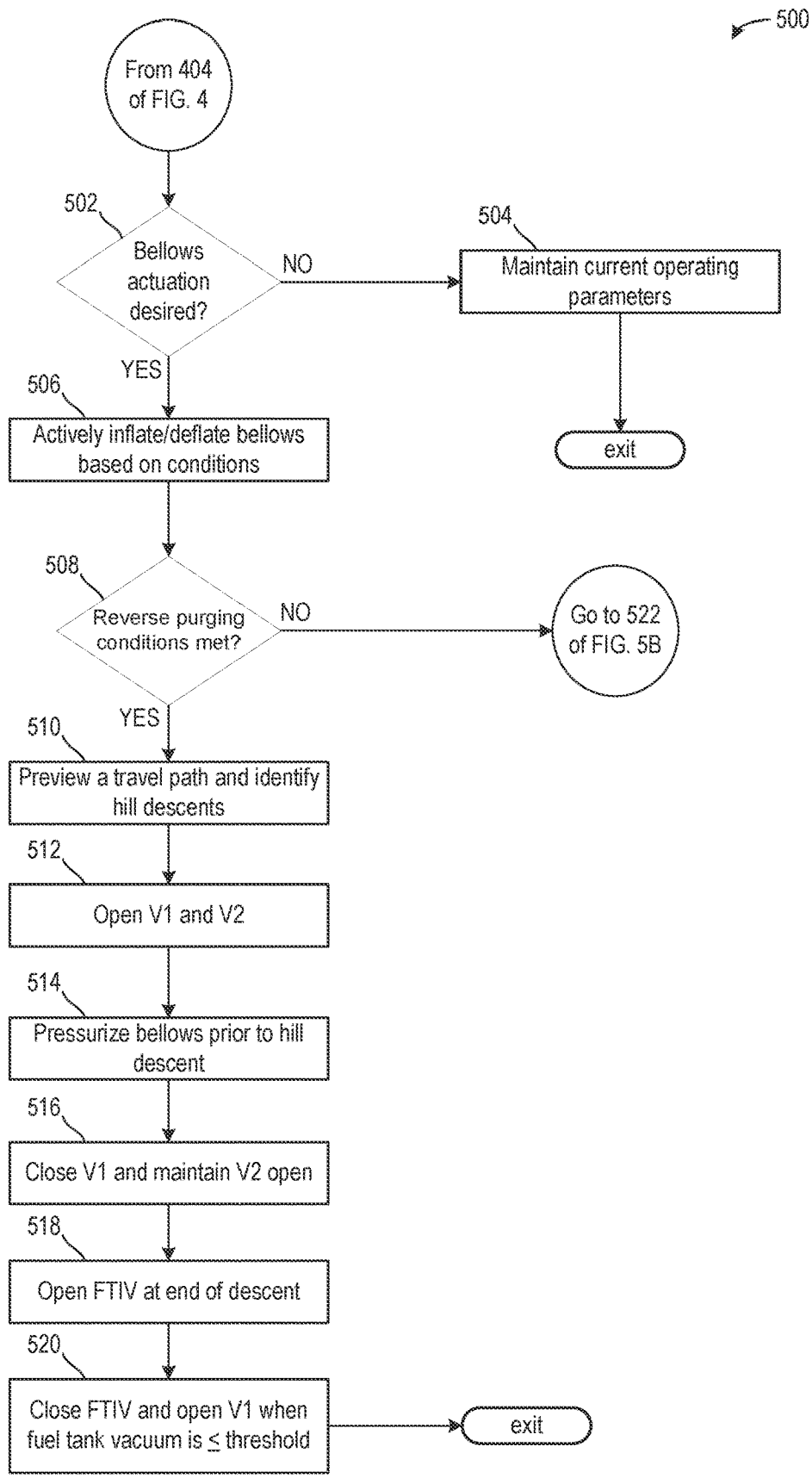
FIG. 5A shows a first part of a method for adjusting the bellows during a reverse purging event
Figure 5B:
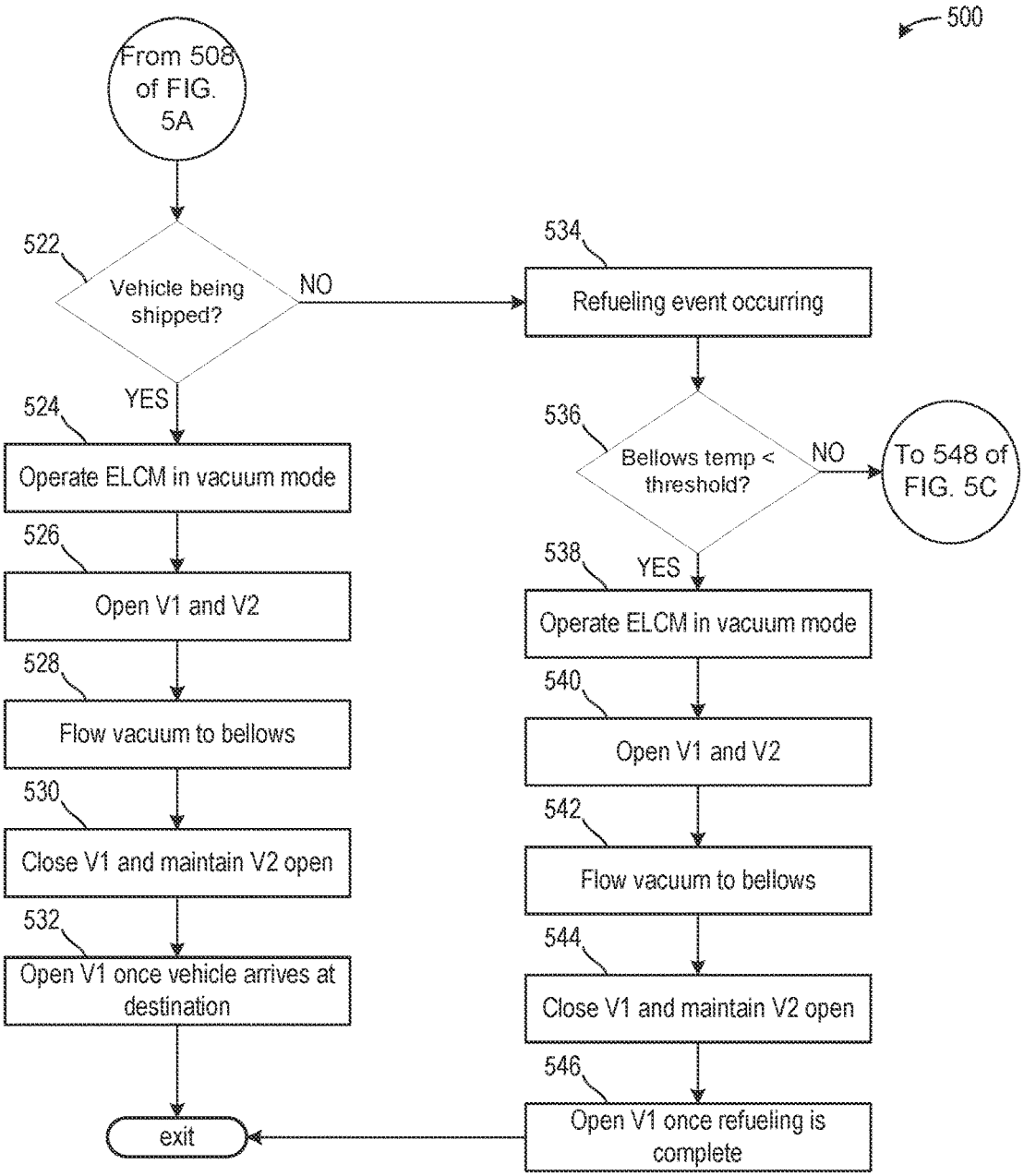
FIG. 5B shows a second part of the method for adjusting the bellows when a vehicle is being shipped and during a refueling event.
Figure 5C:
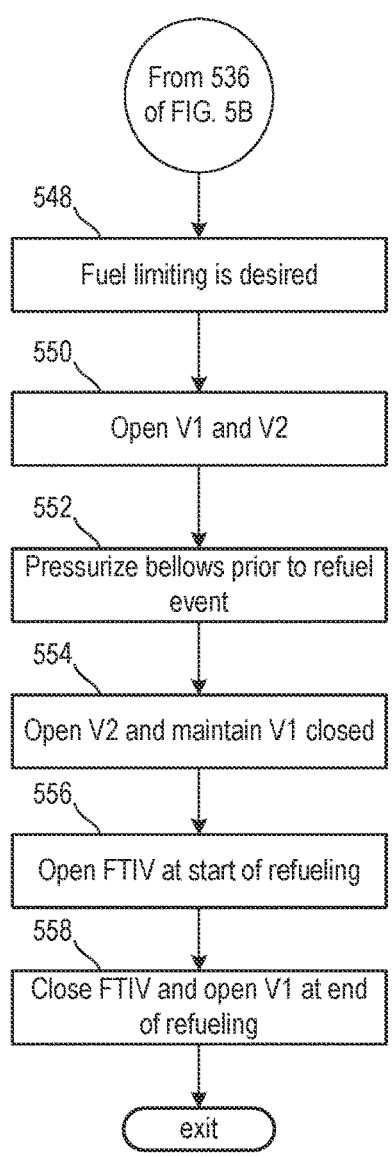
FIG. 5C shows a third part of the method for adjusting the bellows when fuel limiting is desired during the refueling event.
Figure 6:
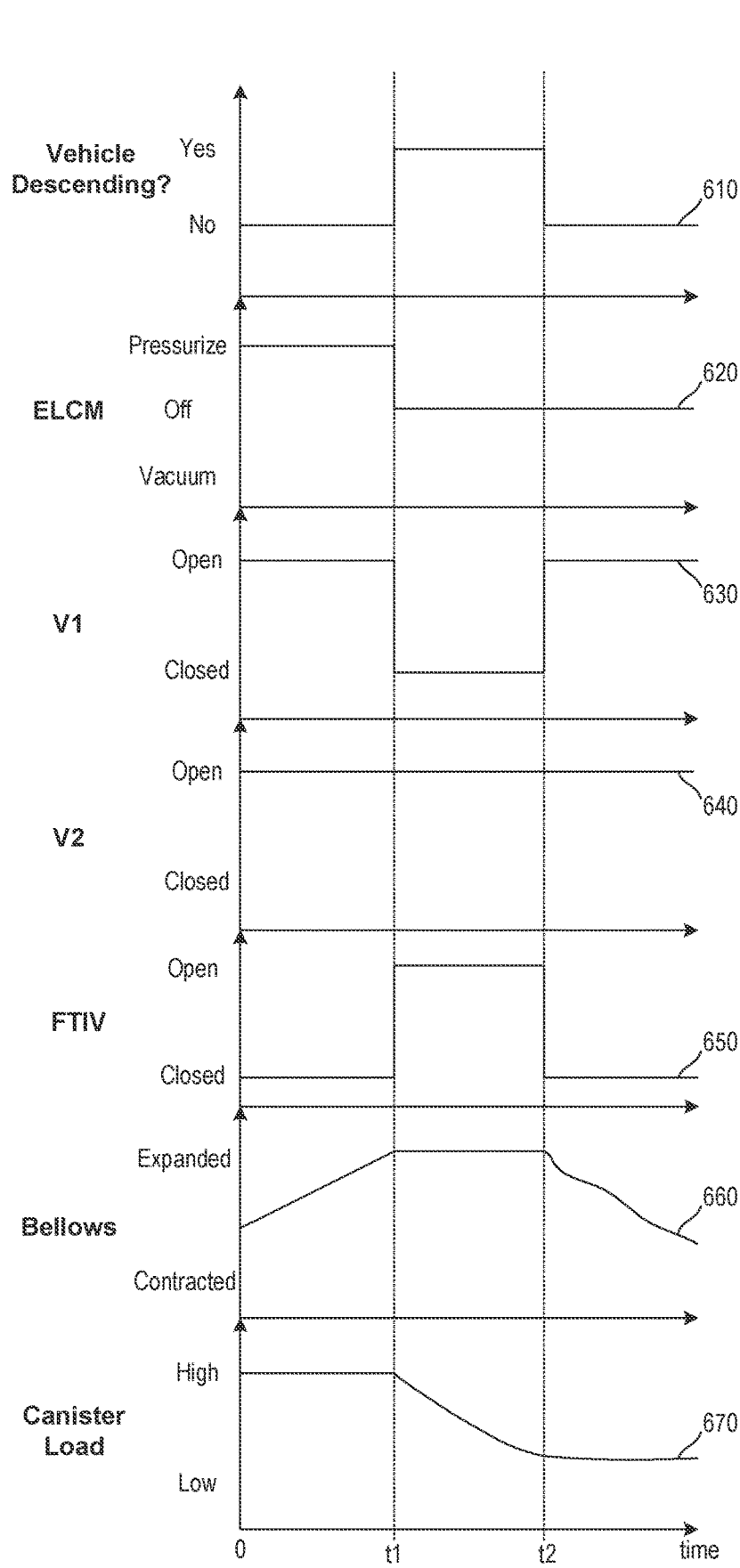
FIG. 6 shows an engine operating sequence illustrating a volume of the bellows being adjusted based on conditions.

The following description relates to methods and systems for diagnosing degradation of components of a fuel system coupled to an engine, such as the fuel system and the engine included in the vehicle system of FIGS. 1 and 2. The fuel system may be coupled to an evaporative emissions control (EVAP) system for storing, filtering, and venting fuel vapors from the fuel tank, the EVAP system further including an evaporative leak check module (ELCM) for diagnostics of the EVAP system. Configurations of the ELCM are shown in FIGS. 3A, 3B. The fuel system component diagnosed may be a variable volume device such as a bellows included in a fuel tank. A control routine such as shown in FIGS. 4A, 4B may be implemented by a controller included in the vehicle system to opportunistically carry out the diagnostic routine during engine off conditions to diagnose a degradation of the bellows. A method for actively adjusting a volume of the bellows outside of the diagnostic is shown in FIGS. 5A, 5B, and 5C. FIG. 6 provides a graphical display of an exemplary diagnostic of the fuel system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122, where the motor may convert the kinetic energy of the vehicle to electrical energy for storage at energy storage device 150 as indicated by arrow 124. This operation may be referred to as regenerative braking of the vehicle. Thus, motor 120 may provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

The fuel tank 144 may be a sealed pressure-less non-integrated refueling canister-only systems (NIRCOS) fuel tank including a built-in variable volume device (e.g., a bellows) that expands and contracts to relieve vacuum and pressure buildups. The bellows may change size to maintain the fuel tank at atmospheric pressure based on pressures in the fuel tank and atmosphere. By maintaining the fuel tank at atmospheric pressure, unsealing of the fuel tank during a refueling request may be expedited without the additional time needed for venting of the tank in a pressurized NIRCOS fuel tank. As will be described herein, the bellows may be configured to expand and contract via operation of a pump to adjust pressures within the fuel tank.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of the engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle, such as from solar or wind energy. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

In some examples, and as will be described in greater detail herein, a flow rate of the fuel dispensing device 170 (herein, interchangeably referred to as a fuel pump) may be provided to the vehicle propulsion system 100 via other vehicles. The vehicles may communicate with one another via a variety of wireless communication systems such as Internet, radio, dedicated short range communication (DSRC), a vehicle-to-vehicle (V2V) infrastructure, a vehicle-to-everything (V2X) infrastructure, or the like.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Referring now to FIG. 2, a schematic diagram 200 depicting a vehicle system 206 is shown. In some examples, vehicle system 206 may be an HEV system, such as a PHEV system. For example, vehicle system 206 may be the same as vehicle propulsion system 100 of FIG. 1. However, in other examples, vehicle system 206 may be implemented in a non-hybrid vehicle (e.g., a vehicle equipped with an engine and without a motor operable to at least partially propel the vehicle).

Vehicle system 206 may include an engine system 208 coupled to each of an evaporative emissions control system 251 and fuel system 140. Engine system 208 may include engine 110 having a plurality of cylinders 230. Engine 110 may include an engine air intake system 223 and an engine exhaust system 225. Engine air intake system 223 may include a throttle 262 in fluidic communication with an engine intake manifold 244 via an intake passage 242. Further, engine air intake system 223 may include an air box and filter (not shown) positioned upstream of throttle 262. Engine exhaust system 225 may include an exhaust manifold 248 leading to an exhaust passage 235 that routes exhaust gas to the atmosphere. Engine exhaust system 225 may include an emission control device 270, which in one example may be mounted in a close-coupled position in exhaust passage 235 (e.g., closer to engine 110 than an outlet of exhaust passage 235) and may include one or more exhaust catalysts. For instance, emission control device 270 may include one or more of a three-way catalyst, a lean nitrogen oxide ($NO_x$) trap, a diesel particulate filter, an oxidation catalyst, etc. In some examples, an electric heater 282 may be coupled to emission control device 270, and utilized to heat emission control device 270 to or beyond a predetermined temperature (e.g., a light-off temperature of emission control device 270).

It will be appreciated that other components may be included in engine system 208 such as a variety of valves and sensors. For example, a barometric pressure sensor 213 may be included in engine air intake system 223. In one example, barometric pressure sensor 213 may be a manifold air pressure (MAP) sensor and may be coupled to engine intake manifold 244 downstream of throttle 262. Barometric pressure sensor 213 may rely on part throttle or full or wide open throttle conditions, e.g., when an opening amount of throttle 262 is greater than a threshold, in order to accurately determine a barometric pressure.

Fuel system 140 may include fuel tank 144 coupled to a fuel pump system 221. Fuel pump system 221 may include one or more pumps for pressurizing fuel delivered to cylinders 230 via fuel injectors 266 during a single cycle of cylinders 230 (while only a single fuel injector 266 is shown at FIG. 2, additional fuel injectors may be provided for each cylinder 230). A distribution or relative amounts of fuel delivered, injection timing, etc. may vary with operating conditions such as engine load, engine knock, exhaust temperature, etc. responsive to different operating or degradation states of fuel system 140, engine 110, etc. A pressure in the fuel system may be estimated via a fuel tank pressure transducer (FTPT) 156. In one example, the FTPT 156 may be included within the fuel tank 144.

Fuel system 140 may be a return-less fuel system, a return fuel system, or any one of various other types of fuel system. Fuel tank 144 may hold a fuel 224 including a plurality of fuel blends, e.g., fuel with a range of alcohol concentrations, such as gasoline, various gasoline-ethanol blends (including E10, E85), etc. A fuel level sensor 234 disposed in fuel tank 144 may provide an indication of the fuel level ("Fuel Level Input") to a controller 212 included in control system 190. As depicted, fuel level sensor 234 may include a float coupled to a variable resistor. Alternatively, other types of fuel level sensors may be used.

Vapors generated in fuel system 140 may be routed to evaporative emissions control system 251 via vapor recovery line 231, before being purged to engine air intake system 223. Vapor recovery line 231 may be coupled to fuel tank 144 via one or more conduits. For example, vapor recovery line 231 may be coupled to fuel tank 144 via at least one conduit 271.

Evaporative emissions control system 251 may further include one or more fuel vapor containers or canisters 222 for capturing and storing fuel vapors. Fuel vapor canister 222 may be coupled to fuel tank 144 via at least one conduit 278 including at least one fuel tank isolation valve (FTIV) 252 for isolating the fuel tank during certain conditions. For example, during engine operation, FTIV 252 may be kept closed to limit the amount of diurnal or "running loss" vapors directed to canister 222 from fuel tank 144. During refueling operations and selected purging conditions, FTIV 252 may be temporarily opened, e.g., for a duration, to direct fuel vapors from the fuel tank 144 to canister 222. Further, FTIV 252 may also be temporarily opened when the fuel tank pressure is higher than a threshold (e.g., above a mechanical pressure limit of the fuel tank), such that fuel vapors may be released into the canister 222 and the fuel tank pressure is maintained below the threshold.

In some examples, vapor recovery line 231 may be coupled to a fuel tank refilling or refueling system 219. In some examples, refueling system 219 may include a fuel cap 205 for sealing off the refueling system from the atmosphere. Refueling system 219 may be coupled to fuel tank 144 via a fuel filler pipe or neck 211. In some examples, fuel filler pipe 211 may include a flow meter sensor 220 operable to monitor a flow of fuel being supplied to fuel tank 144 via the fuel filler pipe (e.g., during refueling).

During refueling, fuel cap 205 may be manually opened or may be automatically opened responsive to a refueling request received at controller 212. A fuel dispensing device (e.g., 170) may be received by, and thereafter fluidically coupled to, refueling system 219, whereby fuel may be supplied to fuel tank 144 via fuel filler pipe 211. Refueling may continue until the fuel dispensing device is manually shut off or until fuel tank 144 is filled to a threshold fuel level (e.g., until feedback from fuel level sensor 234 indicates the threshold fuel level has been reached), at which point a mechanical or otherwise automated stop of the fuel dispensing device may be triggered.

Evaporative emissions control system 251 may include one or more emissions control devices, such as fuel vapor canister 222 filled with an appropriate adsorbent, the fuel vapor canister being configured to temporarily trap fuel vapors (including vaporized hydrocarbons) during refueling operations. In one example, the adsorbent used may be activated charcoal. Evaporative emissions control system 251 may further include a canister ventilation path or vent line 227 which may route gases out of fuel vapor canister 222 to the atmosphere when storing, or trapping, fuel vapors from fuel system 140.

Fuel vapor canister 222 may include a buffer 222a (or buffer region), each of the fuel vapor canister and the buffer including the adsorbent. As shown, a volume of buffer 222a may be smaller than (e.g., a fraction of) a volume of fuel vapor canister 222. The adsorbent in buffer 222a may be the same as, or different from, the adsorbent in fuel vapor canister 222 (e.g., both may include charcoal). Buffer 222a may be positioned within fuel vapor canister 222 such that, during canister loading, fuel tank vapors may first be adsorbed within the buffer, and then when the buffer is saturated, further fuel tank vapors may be adsorbed in a remaining volume of the fuel vapor canister. In comparison, during purging of fuel vapor canister 222, fuel vapors may first be desorbed from the fuel vapor canister (e.g., to a threshold amount) before being desorbed from buffer 222a. In other words, loading and unloading of buffer 222a may not be linear with loading and unloading of fuel vapor canister 222. As such, one effect of buffer 222a is to dampen any fuel vapor spikes flowing from fuel tank 144 to fuel vapor canister 222, thereby reducing a possibility of any fuel vapor spikes going to engine 110.

In some examples, one or more temperature sensors 232 may be coupled to and/or within fuel vapor canister 222. As fuel vapor is adsorbed by the adsorbent in fuel vapor canister 222, heat may be generated (heat of adsorption). Likewise, as fuel vapor is desorbed by the adsorbent in fuel vapor canister 222, heat may be consumed. In this way, the adsorption and desorption of fuel vapor by fuel vapor canister 222 may be monitored and estimated based on temperature changes within the fuel vapor canister.

Vent line 227 may also allow fresh air to be drawn into fuel vapor canister 222 when purging stored fuel vapors from fuel system 140 to engine air intake system 223 via purge line 228 and purge valve 261. For example, purge valve 261 may normally be closed but may be opened during certain conditions so that vacuum from engine intake manifold 244 may be provided to fuel vapor canister 222 for purging. In some examples, vent line 227 may further include an air filter 259 disposed therein downstream of fuel vapor canister 222.

Flow of air and vapors between fuel vapor canister 222 and the atmosphere may be regulated by a canister vent valve 229. Canister vent valve 229 may be a normally open valve, so that FTIV 252 may control venting of fuel tank 144 with the atmosphere. As described above, FTIV 252 may be positioned between fuel tank 144 and fuel vapor canister 222 within conduit 278. In a NIRCOS fuel system, the FTIV 252 may be a normally closed valve, that when opened during conditions such as refueling, allows for venting of fuel vapors from fuel tank 144 to fuel vapor canister 222. FTIV 252 may also be opened upon the pressure in the fuel tank 144 increasing to a threshold pressure. Fuel vapors may then be vented to atmosphere via canister vent valve 229, or purged to engine air intake system 223 via canister purge valve 261.

In some examples, evaporative emissions control system 251 may further include an evaporative level check monitor (ELCM) 295. ELCM 295 may be disposed in vent line 227 and may be configured to control venting and/or assist in detection of undesired evaporative emissions. As an example, ELCM 295 may include a vacuum pump for applying negative pressure to the fuel system when administering a test for undesired evaporative emissions. In some embodiments, the vacuum pump may be configured to be reversible. In other words, the vacuum pump may be configured to apply either a negative pressure or a positive pressure on the evaporative emissions control system 251 and fuel system 140. ELCM 295 may further include a reference orifice (not shown), a pressure sensor 297, and a changeover valve (COV) 296. A reference check may thus be performed whereby a vacuum may be drawn across the reference orifice, where the resulting vacuum level comprises a vacuum level indicative of an absence of undesired evaporative emissions. For example, following the reference check, the fuel system 140 and evaporative emissions control system 251 may be evacuated by the ELCM vacuum pump. In the absence of undesired evaporative emissions, the vacuum may pull down to the reference check vacuum level. Alternatively, in the presence of undesired evaporative emissions, the vacuum may not pull down to the reference check vacuum level.

During select engine and/or vehicle operating conditions, such as after an emission control device light-off temperature has been attained (e.g., a threshold temperature reached after warming up from ambient temperature) and with the engine running, the controller 212 may control the ELCM 295 changeover valve (COV) 296 to enable fuel vapor canister 222 to be fluidically coupled to atmosphere. For example, ELCM COV 296 may be configured in a first position (e.g. opened), where the first position includes the fuel vapor canister 222 fluidically coupled to atmosphere, except during pressure tests performed on the system. In one example, under natural aspiration conditions (e.g. intake manifold vacuum conditions), ELCM COV 296 may be configured in a second position (e.g. closed) to seal the fuel vapor canister 222 from atmosphere. By commanding ELCM COV 296 to the second position, the evaporative emissions control system 251 and fuel system 140 may be evacuated in order to ascertain the presence or absence of undesired evaporative emissions.

Undesired evaporative emission detection routines may be intermittently performed by controller 212 on fuel system 140 to confirm that the fuel system is not degraded. As such, undesired evaporative emission detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, undesired evaporative emission detection routines may be performed while the engine is running by operating a vacuum pump and/or using engine intake manifold vacuum. Undesired evaporative emission tests may be performed by the ELCM 295 communicatively coupled to controller 212. ELCM 295 may further include a reference orifice. Following the application of vacuum to the fuel system, a change in pressure at the reference orifice (e.g., an absolute change or a rate of change) may be monitored via the pressure sensor 297, and compared to a threshold. Based on the comparison, undesired evaporative emissions from the fuel system may be identified. The ELCM vacuum pump may be a reversible vacuum pump, and thus configured to apply a positive pressure to the fuel system when a bridging circuit is reversed placing the pump in a second conformation. Example positions of the ELCM pump are shown in FIGS. 3A, 3B.

Fuel system 140 may be a non-integrated refueling canister-only system (NIRCOS), in that fuel tank 144 may be substantially isolatable from fuel vapor canister 222 such that fuel vapors in fuel tank 144 and fuel vapor canister 222 may be independently controlled as desired (e.g., during refueling). During periods in which fuel tank 144 is fluidically decoupled from fuel vapor canister 222, a fuel vapor pressure may develop within the fuel tank. Accordingly, venting and depressurization control routines are often implemented for NIRCOS fuel tanks, along with structural reinforcement thereof. For example, a given NIRCOS may include numerous valves and venting lines coupled to fuel tank(s) included therein to ensure that any excess fuel vapor pressure is properly evacuated or redistributed. Further, NIRCOS fuel tanks may be constructed of high tensile-strength material, such as heavy steel, and configured with a plurality of standoffs therein, the plurality of standoffs extending between opposing walls of a given NIRCOS fuel tank, such that greater fuel vapor pressures may be withstood without fuel tank degradation.

As an alternative, fuel system 140 may include a bellows 291 to maintain a fuel vapor pressure of fuel tank 144 at, or near, atmospheric pressure. As such, complex structural configurations for managing excess fuel vapor pressure may be obviated. Specifically, bellows 291 may be disposed within and affixed to an upper surface 145 of fuel tank 144 having an atmospheric port 293. The bellows may include collapsible sections with may expand and collapse based on pressure in the fuel tank and within the bellows.

In a maximally expanded position of the bellows 291, the bellows 291 may extend to a fuel level value of 40%. As the bellows 291 is contacted by rising fuel 224 during refueling, the bellows may compress along an axis 292 proportionally with an increase in the fuel level in fuel tank 144 (up until the bellows reaches a maximally compressed configuration). During compression, air within bellows 291 may be evacuated via the atmospheric port 293. After refueling and during engine operation, fuel 224 may be provided to engine 110 via actuation of fuel pump system 221, such that the fuel level in fuel tank 144 may fall and bellows 291 may expand proportionally along axis 292 (up until the bellows again attains the maximally expanded configuration). During expansion, a pressure differential may be generated between bellows 291 and the surrounding environment such that air may be induced into the bellows via the atmospheric port 293.

In this way, a variable volume configuration may be provided to fuel tank 144 via expansion and contraction of bellows 291, such that a fuel vapor pressure of the fuel tank may be maintained within a threshold range of a predetermined pressure (e.g., an ambient pressure of the surrounding environment). In some examples, the fuel vapor pressure of fuel tank 144 may be maintained within the threshold range even across widely varying ambient temperatures, such as between 40 and 95° F. As such, fuel tank 144 may be formed from materials having relatively weaker strength compared to NIRCOS fuel tanks described above and including fewer or no standoffs therein. Further, a more simplified configuration of valves and lines may be included in fuel system 140 relative to other NIRCOSs, as complex depressurization/venting routines may be obviated by the presence of bellows 291.

The atmospheric port 293 of the bellows 291 may be routed to the vent line 227 between the canister 222 and the ELCM system 295 of the evaporative emissions control system 251 via a vapor line 299. In the illustrated example, a first end of the vapor line 299 is attached to the atmospheric port 293 of the bellows 291 via a first valve 286 and a second end of the vapor line 299 is attached to the vent line 227 via the canister vent valve 229. Herein, the canister vent valve 229 is interchangeably referred to as a second valve 229. As such, the canister vent valve 229 may be a multi-position valve configured to seal the ELCM 295, the canister 222, and the vapor line 299 from one another in a closed position. Open positions of the second valve 229 may further include only coupling the vapor line 299 to the ELCM 295, only coupling the vapor line 299 to the canister 222, only coupling the ELCM 295 to the canister 222, and coupling all of the vapor line 299, the ELCM 295, and the canister 222. This establishes a fluidic communication between the bellows 291 of the fuel tank 144 and the ELCM system 295.

The first valve 286 and the second valve 229 may be maintained in their respective open positions to allow air flow into and out of the bellows 291 via the atmospheric port 293 and the vapor line 299. In one example, the vent valve 229 may be eliminated and the second valve 229 may be housed in the vent line 227 to regulate fluidic communication between the ELCM 295 and the canister 222, and between the ELCM 295 and the bellows 291. As an example, in a first (default) configuration of the second valve 229, the ELCM 295 may be coupled to the canister 222 while, in a second configuration of the second valve 229, the ELCM 295 may be coupled to the bellows 291.

A pressure sensor 289 may be arranged between the second valve 229 and the ELCM system 295. In one example, the pressure sensor 289 may be used to replace pressure sensor 297. Additionally or alternatively, both sensors may be included in the EVAP system 251 as shown in FIG. 2. The pressure sensor 289 may provide feedback to controller 212 regarding a pressure of the bellows 291, in one example.

Fuel system 140 may be operated by controller 212 in a plurality of modes by selective adjustment of the various valves (e.g., responsive to the various sensors). For example, fuel system 140 may be operated in a refueling mode (e.g., when refueling is requested by a vehicle operator), wherein controller 212 may close FTIV 252, allowing bellows 291 to maintain the fuel vapor pressure of fuel tank 144 within the threshold range of the predetermined pressure. However, if bellows 291 is compressed to the maximally compressed configuration, and the fuel vapor pressure begins increasing beyond which is manageable by fuel tank 144 (e.g., when the fuel tank becomes undesirably overfilled), fuel system 140 may be operated in a venting mode. In the venting mode, controller 212 may open FTIV 252 and canister vent valve 229, while maintaining canister purge valve 261 closed, to direct refueling vapors into fuel vapor canister 222 while preventing fuel vapors from being directed into engine intake manifold 244 (and thus provide a venting path for fuel vapors). As such, opening FTIV 252 may allow refueling vapors to be stored in fuel vapor canister 222. After refueling is completed, at least FTIV 252 may be closed once again.

As another example, the fuel system may be operated in a canister purging mode (e.g., after a given emission control device light-off temperature has been attained and with engine 110 running), wherein controller 212 may open canister purge valve 261 and canister vent valve 229 while closing FTIV 252. Herein, the vacuum generated by engine intake manifold 244 of (operating) engine 110 may be used to draw fresh air through vent line 227 and through fuel vapor canister 222 to purge stored fuel vapors into engine intake manifold 244. As such, in the canister purging mode, the purged fuel vapors from fuel vapor canister 222 may be combusted in engine 110. The canister purging mode may be continued until an amount or level of stored fuel vapors in fuel vapor canister 222 are below a threshold amount or level.

As another example, the fuel system may be operated during a diagnostics test of a component of the fuel tank 144 (e.g., bellows 291) at engine off event. The pump of the ELCM 295 may be operated during an engine-off condition when fuel contained in the fuel tank 144 is not contacting a surface of the bellows 291. Prior to operating the pump, the COV 296 of the ELCM is closed, and the CVV 229 is closed to isolate the ELCM from the fuel vapor canister 222. Also, the second valve 229 may be opened and the first valve 286 may be closed to fluidically couple the ELCM 295 to the vapor line 299, and then the pump may be activated in a vacuum mode. A pressure at the vapor line 299 may be monitored via the ELCM pressure sensor 297 for a first threshold duration, and in response to the pressure at the vapor line decreasing to a first threshold pressure within the first threshold duration, the first valve 286 may be opened to fluidically couple the bellows 291 to the ELCM, and the change in pressure at the bellows may be monitored via the ELCM pressure sensor for a second threshold duration. In response to the pressure at the vapor line not decreasing to the first threshold pressure within the first threshold duration, degradation of the vapor line 299 may be indicated and diagnostics of the bellows 291 may be discontinued. In response to the pressure at the bellows not reducing to a second threshold pressure within the second threshold duration, degradation of the bellows 291 may be indicated and a diagnostic code may be set. In response to the pressure at the bellows smoothly reducing to the second threshold pressure within the second threshold duration and a fuel tank pressure remaining substantially constant over the second threshold duration, the bellows 291 may be indicated to be stiff and not degraded. In response to the pressure at the bellows reducing to the second threshold pressure within the second threshold duration in steps and the fuel tank pressure reducing over the second threshold duration, the bellows 291 may be indicated to be compliant and not degraded.

Details of the diagnostics routine for the bellows 291 is elaborated in FIGS. 4A-4B. Following the diagnosis, the vehicle operator may be notified with specific maintenance instructions and/or one or more vehicle operating parameters may be altered to mitigate degradation to vehicle performance and component reliability. Adjusting operation of the vehicle includes, during subsequent drive cycles, propelling the vehicle with motor torque and not refilling the fuel tank to above the threshold fuel level. Also, upon confirmation that the bellows 291 is degraded, the first valve 286 may be closed to disable communication between the bellows and the vent line 227, and FTIV 252 may be opened.

The pump of the ELCM 295 may be further operated outside of the diagnostic routine to adjust a pressure of an interior of the bellows 291, thereby changing its volume (e.g., size) within the fuel tank. Details of actuating the bellows via operating the pump in a pressure mode or a vacuum mode in combination with adjusting the first valve 286 and the second valve 229 are described in FIGS. 5A-5C.

Control system 190, including controller 212, is shown receiving information from a plurality of sensors 216 (various examples of which are described herein) and sending control signals to a plurality of actuators 281 (various examples of which are described herein). As one example, sensors 216 may include one or more of exhaust gas sensor 237 located upstream of emission control device 270 in exhaust passage 235, temperature sensor 233 located downstream of emission control device 270 in exhaust passage 235, flow meter sensor 220 located in fuel filler pipe 211, fuel level sensor 234 located in fuel tank 144, temperature sensor 232 located in fuel vapor canister 222, FTPT 156, and ELCM pressure sensor 297. Other sensors such as pressure, temperature, air/fuel ratio, and composition sensors may be coupled to various locations in vehicle system 206. As an additional or alternative example, actuators 281 may include fuel injector 266, throttle 262, FTIV 252, canister purge valve 261, canister vent valve 229, first valve 286 and second valve 229 of the fuel system, and ELCM COV 296. Controller 212 may receive input data from sensors 216, process the input data, and trigger actuators 281 in response to the processed input data based on instructions or code programmed in non-transitory memory therein, the instructions or code corresponding to one or more control routines.

FIG. 3A shows a first schematic depiction 300 of the evaporative leak check module (ELCM) 395 in a first configuration where a fuel vapor canister (such as canister 222 in FIG. 2) of the evaporative emissions control system is vented to atmosphere. FIG. 3B shows a second schematic depiction 350 of the ELCM 395 in a second configuration. The ELCM 395 in FIGS. 3A,B may be the ELCM 295 in FIG. 2

ELCM 395 includes a changeover valve (COV) 313, a vacuum pump 330, and a pressure sensor 396. Vacuum pump 330 may be a reversible pump, for example, a vane pump. COV 313 may be moveable between a first and a second position. In the first position, as shown in FIG. 3A, air may flow through ELCM 395 via first flow path 320. In the second position, as shown in FIG. 3B, air may flow through ELCM 395 via second flow path 323. The position of COV 313 may be controlled by solenoid 310 via compression spring 303. ELCM 395 may also comprise reference orifice 340. Reference orifice 340 may have a diameter corresponding to the size of a threshold leak to be tested, for example, 0.02". In either the first or second position, pressure sensor 396 may generate a pressure signal reflecting the pressure within ELCM 395. Operation of pump 330 and solenoid 310 may be controlled via signals received from controller 212.

As shown in FIG. 3A, in the first configuration, COV 313 is in the first position, and pump 330 is deactivated. This configuration allows for air to freely flow between atmosphere and the canister via first flow path 320. This configuration may be used during a canister purging operation, for example, or during other conditions where the fuel vapor canister is to be vented to atmosphere. Upon receiving a request for refueling, the COV 313 may be actuated to the first position (first position of ELCM), to facilitate air flow through the canister and venting of the refueling vapor from the fuel tank to the canister.

As shown in FIG. 3B, COV 313 is in the second position, and pump 330 is activated in a first direction. This configuration allows pump 330 to draw a vacuum on fuel system 140 via vent line 227. In examples where fuel system 140 includes FTIV 252, FTIV 252 may be opened to allow pump 330 to draw a vacuum on fuel tank 144. Air flow through ELCM 395 in this configuration is represented by arrows. In this configuration, as pump 330 pulls a vacuum on fuel system 140, the absence of undesired evaporative emissions from the system should allow for the vacuum level in ELCM 395 to reach or exceed the previously determined vacuum threshold using reference orifice 340. In the presence of an evaporative emissions system breach larger than the reference orifice, the pump will not pull down to the reference check vacuum level, and undesired evaporative emissions may be indicated.

In one example, the configuration of the ELCM 395 in the embodiment of FIG. 3B may be used to contract a size of the bellows 291. During diagnostics of a fuel system component such as bellows 291 within a fuel tank, the COV 313 is in the second position, and pump 330 is activated in the first direction. The FTIV 252 may be closed, the vent valve 229 may be closed, the first valve 286 may be opened and the second valve 229 may be opened to draw a vacuum on the bellows 291 via the vapor line 299 and the atmospheric port 293. Presence or absence of degradation in the bellows 291 may be determined based on change in pressure at the bellows as recorded by the pressure sensor 396 and the FTPT 156.

Additionally or alternatively, the pump 330 may be activated in a second direction, wherein pressurized air may flow to the canister via the vent line 227. This may be referred to as a pressure mode of the pump and may be used to inflate (e.g., expand) the bellows in the fuel tank.

In this way, the components of FIGS. 1-3A, 3B enable a system for a vehicle, comprising: a variable volume device disposed within a fuel tank, an atmospheric port of the variable volume device fluidly coupled to a vent line upstream of a leak detection module (ELCM) of an evaporative emissions control (EVAP) system via a vapor line, the vent line coupling a fuel vapor canister of the EVAP to atmosphere, and a controller with computer-readable instructions stored on non-transitory memory which when executed cause the controller to: fluidically couple a pump of the ELCM to the variable volume device via the vapor line, operate the pump to evacuate the variable volume device over a threshold duration, and indicate the variable volume device as robust or degraded based on a first pressure estimated via an ELCM pressure sensor and a second pressure estimated via a fuel tank pressure sensor. The variable volume device may be indicated to be robust in response to the first pressure reducing to a threshold pressure within the threshold duration, and the variable volume device may be indicated to be degraded in response to the first pressure not reducing to the threshold pressure within the threshold duration and a change in the second pressure following a change in the first pressure.

Turning now to FIG. 4A-4B, an example method 400 is shown for diagnosing of a variable volume device such as bellows (such as bellows 291 in FIG. 2) included in a fuel tank during an engine-off condition. Instructions for carrying out method 400 may be executed by a controller based on instructions stored on a memory of the controller and in conjunction with signals received from sensors of the vehicle system, such as the sensors described above with reference to FIGS. 1-2. The controller may employ actuators of the vehicle system to adjust a vehicle display, according to the methods described below.

At 402, the method includes estimating and/or measuring vehicle and engine operating conditions. These include, for example, if the vehicle is propelled via motor torque and/or engine torque, torque demand, manifold pressure, manifold air flow, fuel level in fuel tank, ambient conditions (ambient temperature, pressure, and humidity, for example), engine conditions such as engine speed, engine temperature, engine dilution, etc.

At 404, the routine includes determining if conditions are met for diagnostics of the bellows. The conditions may include an engine-off condition when the vehicle is no longer propelled via engine torque. During an engine-off condition, fuel is not delivered from the fuel tank and a fuel pump may be maintained inactive. The conditions for carrying out the diagnostics routine for the bellows may further include that the fuel level in the fuel tank is below a threshold fuel level. A fuel level at or below the threshold fuel level may ensure that the lower surface of the bellows is not contacting any fuel upon full extension of the bellows. In other words, if the fuel level in the tank is below the threshold level, liquid fuel may not be contacting the bellows. In one example, the threshold fuel level may be 40% of the total capacity (highest permissible fuel level).

If it is determined that the conditions are not met for diagnostics of the bellows, then the method 400 may transition to 502 of method 500 of FIG. 5A.

If it is determined that conditions are met for diagnostics of the bellows, at 408, a first valve, V1 (such as first valve 286 in FIG. 2) coupled to the atmospheric port of the bellows may be actuated to a closed position and a second valve, V2 (such as second valve 229 in FIG. 2) coupled to a junction of a vent line and a vapor line (such as vapor line 299 in FIG. 2) may be actuated to an open position. By opening V2, a fluidic communication may be established between an ELCM system (such as ELCM 295 in FIG. 2) and the vapor line. By closing V1, communication between the ELCM system and the bellows is severed. Also, a canister vent valve (such as CVV 229 in FIG. 2) housed in the vent line between the ELCM and a fuel vapor canister may be actuated to a closed position to isolate the canister from the ELCM. Further a fuel tank isolation valve (such as FTIV 252 in FIG. 2) may be closed to discontinue fluidic communication between the fuel tank and the canister.

At 410, the changeover valve (Such as COV 313 in FIG. 3B) may be actuated to a closed position (such as shown in FIG. 3B) to establish fluidic communication of the ELCM pump (such as pump 330 in FIG. 3B) with the vent line. Due to the closing of the CVV and opening of the V2, the ELCM pump may be fluidically coupled to the vapor line between the bellows and the vent line. The ELCM pump may then be operated in a vacuum mode. The ELCM vacuum pump may be a reversible vacuum pump, and thus configured to apply a negative pressure to the vapor when a bridging circuit is reversed. Upon operation of the ELCM pump, the vapor line may be evacuated.

As the vapor line is being evacuated, at 412, the pressure at the ELCM (ELCM pressure, P1) as estimated via the ELCM pressure sensor may be monitored for a first threshold duration. The ELCM pressure may be equal to the pressure in the vapor line. The first threshold duration may be calibrated based on a time needed by the ELCM pump to evacuate the vapor line to a first threshold pressure level (Th1). The first threshold pressure level may be a pre-calibrated pressure level based on geometry of the fuel system.

At 414, the routine includes determining if the ELCM pressure P1 has reduced to the first threshold pressure (Th1) within the first threshold duration. If it is determined that the P1 has not reduced to Th1 within the first threshold duration, it may be inferred that there is a degradation such as a leak in the vapor line. At 416, the degradation in the vapor line may be indicated such as by raising a flag and setting a diagnostic code. The operator may be notified via an indication in the vehicle dash board. Further diagnostics of the bellows may be aborted. At 418, in response to the detection of degradation of the vapor line, vehicle operation may be adjusted during subsequent engine cycles until the vapor line is serviced. Example adjustments to the vehicle operation may include operating the vehicle in an electric drive mode, where only a motor may propel drive wheels of the vehicle so that the fueling system is not relied upon to power the engine. Due to the fuel pump not being active, agitation of fuel in the tank may be reduced, thereby reducing the possibility of fuel entering the bellows and fuel vapor forming within the vapor line.

If it is determined that the P1 has reduced to Th1 within the first threshold duration, it may be inferred that the vapor line has been evacuated and there is no degradation in the vapor line. The bellows diagnostics may be carried forward. At 420, V1 may be actuated to an open position. With both V1 and V2 open, the ELCM pump is fluidically coupled to the bellows. As the ELCM pump is continued to be operated, the bellows may be evacuated via the vapor line.

At 422, the pressure at the ELCM, P1 (ELCM pressure) as estimated via the ELCM pressure sensor may be monitored for a second threshold duration and the pressure within the fuel tank, P2 (outside the bellows) as estimated via a fuel tank pressure sensor (such as FTPT 156 in FIG. 2) may be monitored over the second threshold duration. The ELCM pressure may be equal to the pressure in the bellows. The second threshold duration may be calibrated based on a time needed by the ELCM pump to evacuate the bellows to a second threshold pressure level (Th2). The second threshold pressure level may be a pre-calibrated pressure level based on geometry of the bellows. In one example, since the volume of the bellows may be higher than the vapor line, the time to evacuate the bellows (second threshold duration) may be higher than the time to evacuate the vapor line alone (first threshold duration).

In one example, based on the material of the bellows, the bellows may be stiff (not compliant) such as during cold weather conditions. If the bellows are stiff, as the air is sucked out of the bellows via the atmospheric port, the size and shape of the bellows may not change and the sections of the bellows may not collapse. Due to the shape and size of the bellows not changing, the vapor pressure in the fuel tank (outside the bellows) may not change significantly (such as more than 10%) and the pressure estimated via a fuel tank pressure sensor may not record a substantial change in fuel tank pressure. The pressure at the bellows may continue to drop during the evacuation and the drop in pressure may be recorded by the ELCM pressure sensor.

In another example, based on the material of the bellows, the bellows may be compliant (not stiff) such as during warm weather conditions. If the bellows are compliant, as the air is sucked out of the bellows via the atmospheric port, the sections of the bellows may collapse and the size of the bellows may shrink. Due to shrinking of the bellows within the sealed fuel tank, the vapor space inside the fuel tank may increase. As the vapor space within the fuel tank increases, the pressure within the fuel tank, estimated via the fuel tank pressure sensor, may record a decrease in fuel tank pressure. Also, the pressure at the bellows may continue to drop during the evacuation and the drop in pressure may be recorded by the ELCM pressure sensor. In this way, both the pressure at the bellows and the pressure in the fuel tank may decrease during the evacuation but the rate of change of pressure at the bellows may be different from the rate of change in fuel tank pressure.

At 424, the routine includes determining if the ELCM pressure, P1 (which is equivalent to the pressure at the bellows) has decreased to the second threshold pressure within the second threshold duration, Th2 and if the fuel tank pressure, P2 is substantially constant (such as within 10% variation) over the duration of evacuation of the bellows. If it is confirmed that P1 has reduced to Th2 within the second threshold duration and P2 has remained substantially constant, it may be inferred that the bellows are stiff and while the bellows are being successfully evacuated, the size of the bellows has not changed significantly. In a stiff bellows, the pressure in the bellows may decrease steadily without distinct steps (smooth decrease and not choppy). Also, since it was possible to evacuate the bellows, it may be inferred that there are no degradations such as leaks in the bellows. At 426, the routine may indicate that the bellows are not degraded. Since the bellows are robust, engine operation need not be altered to compensate for degradation in the bellows. At 428, the ELCM pump may be deactivated upon completion of the diagnostics. The first valve V1 and the second valve V2 may be maintained in respective open positions. Method 400 ends.

If at 424 it is determined that P1 has not reduced to Th2 within the second threshold duration and P2 has not remained substantially constant, the routine may continue to step 432 in FIG. 4B. At 432, the routine includes determining if P1 has reduced to Th2 in steps and if P2 was decreasing in steps within the second threshold duration. If the bellows is compliant, as the air is sucked out, the sections may collapse. Each collapse of a section may correspond to a change in the slope of a P1 vs time plot. The changes in rate of change in pressure during the evacuation upon each section collapsing may give rise to steps in the P1 vs time plot (as seen in FIG. 6). Also, with the decrease in bellows size (volume), the vapor space in the fuel tank increases and the fuel tank pressure decreases. The decrease in P2 may also follow the steps corresponding to the change in P1 with each section collapsing.

If it is determined that P1 has reduced to Th2 in steps and P2 was decreasing in steps within the second threshold duration, it may be inferred that the bellows are compliant and while the bellows are being successfully evacuated, the size of the bellows changed significantly due to collapsing of sections. In a compliant bellows, the pressure in the bellows may decrease with distinct steps (not smooth decrease). Also, since it was possible to evacuate the bellows, it may be inferred that there are no degradations such as leaks in the bellows. At 434, the routine may indicate that the bellows are not degraded. Upon completion of the diagnostic routine, at 436, the ELCM pump may be deactivated. The COV within the ELCM may be opened. The first valve V1 and the second valve V2 may be maintained in their respective open positions to continue fluidic communication between the atmospheric port of the bellows and the vent line. Method 400 ends.

If it is determined that P1 has not reduced to Th2 in steps or smoothly within the second threshold duration, it may be inferred that the bellows are degraded. Since it was previously confirmed that the vapor line is not degraded, the degradation is confirmed to be within the bellows. As an example, the bellows may include one or more leaks which prevents evacuation of the bellows. At 440, the degradation in the bellows may be indicated such as by raising a flag and setting a diagnostic code. The operator may be notified via an indication in the vehicle dash board. Additionally or alternatively, the driver indication may include lighting a malfunction indicator lamp (MIL) and the diagnostic code may be set and stored in the memory of the engine controller. In one example, lighting the MIL may indicate a request that the vehicle be taken to a service technician, and the diagnostic code that is set may indicate to the service technician that the bellows included in the fuel tank is degraded. The light and the code may reset after the vehicle has been serviced and the degraded bellows has been replaced or repaired.

Upon completion of the diagnostics and detection of degradation of the bellows, at 442, the ELCM pump may be deactivated and the COV may be reopened. At 444, in order to isolate the degraded bellows from the vent line and inhibit flow of fuel vapors from within the bellow to the atmosphere via the vent line, each of the first valve V1 and the second valve V2 may be actuated to their respective closed positions. Also, the FTIV coupling the fuel tank to the fuel vapor canister may be adjusted to a fully open position to vent at least some of the fuel vapor in the fuel tank.

When the bellows are degraded, at least a portion of the liquid fuel may enter into the bellows and at least a portion of the fuel vapor in the fuel tank may escape through the atmospheric port and the vapor line coupled to the bellows. Accordingly, to mitigate an amount of untreated fuel vapors escaping from the fuel tank, at 446, one or more of the vehicle operating parameters that generate excess fuel vapors may be altered or adjusted. The engine controller may command the vehicle enter an electric drive mode, where only a motor may propel drive wheels of the vehicle so that the fueling system is not relied upon to power the engine. Due to the fuel tank not being active, agitation of fuel in the tank may be reduced, thereby reducing the possibility of fuel entering the bellows and fuel vapor forming within the bellows. If engine is operated, the engine torque demand may be reduced to reduce fuel pump duty cycle and consequent heating from the pump. Additionally, the driver indication may include an advisory against refilling the fuel tank to above the threshold fuel level and parking the vehicle on an inclined slope greater than a threshold incline, such as 6%. Further, the driver may be instructed to park the vehicle in a shade to reduce vaporization of fuel due to hot ambient conditions (from solar heat). The one or more vehicle operating conditions may remain altered or adjusted until servicing of the fuel system may be performed and the bellows of the fuel tank is repaired. Method 400 ends.

In some examples, it may be desired to execute a diagnostic of the bellows to ensure a leak is not present prior to actively adjusting a volume of the bellows based on the method 500 of FIGS. 5A, 5B, and 5C.

Turning now to FIGS. 5A, 5B, and 5C, they show the method 500 for adjusting actively adjusting the volume of the bellows in response to conditions. The volume of the bellows may be adjusted to modify conditions within the fuel tank to execute reverse purging, adjust refueling conditions, and/or mitigate degradation during transportation of the vehicle.

The method 500 begins at 502, which includes determining if actuation of the bellows is desired. Actuation of the bellows may be desired during a plurality of conditions. The plurality of conditions may include reverse purging, vehicle shipping, and vehicle refueling. If bellows actuation is not desired, then at 504, the method 500 may include maintaining current operating parameters. The first valve and the second valve may be open to maintain air flow between the EVAP system and the bellows. The bellows volume may be passively adjusted via a pressure of the fuel tank and the EVAP system. The ELCM is not activated to adjust the volume of the bellows.

If actuation of the bellows is desired, then at 508, the method 500 may include actively inflating or deflating the bellows based on conditions. The bellows may be actuated via adjusting operation of the first valve and the second valve (e.g., first valve 286 and second valve 229 of FIG. 2, respectively). Herein, the first valve is referred to as V1 and the second valve is referred to as V2. Operation of the ELCM may be adjusted to a pressure more to expand the bellows or a vacuum mode to retract the bellows. By doing this, a stiffness of the bellows and a volume of the fuel tank may be adjusted.

At 508, the method 500 may include determining if reverse purging conditions are met. Reverse purging conditions may include operating in an all-electric mode following a refueling event. Reverse purging may include flowing vapors from a canister to the fuel tank. By doing this, a likelihood of the canister releasing vapors to the atmosphere may be avoided while the engine is not combusting fuel. In some examples, conditions for reverse purging may include a vehicle descent (e.g., a vehicle decrease in elevation).

At 510, the method 500 may include previewing a travel path and identify descents. Descent may be identified as segments of the travel path where an end elevation is less than a starting elevation. The travel path may be provided via the vehicle operator to a navigation system, to a GPS unit or mobile device communicatively coupled to the vehicle, or the like. Additionally or alternatively, the travel path may be determined based on previous routes driven, wherein the travel path is determined based on a current time of day and location matching a previous route driven. Additionally or alternatively, the descent may be identified in real-time via topography maps, street signs, and feedback from other vehicles within a determined distance.

At 512, the method 500 may include opening V1 and V2. In one example, the controller signals to actuators of V1 and V2 to adjust them to open positions. As such, the interior of the bellows may be fluidly coupled to the vent line.

At 514, the method 500 may include pressurizing the bellows prior to a hill descent. The ELCM may be operated in a pump mode, where positive pressure (e.g., pressurized air) is provided to the vent line. The pressurized air may flow to the interior of the bellows, expanding the bellows. The bellows may be relatively stiff and immovable via fuel vapors in the fuel tank alone. Pressurizing the bellows prior to the hill descent may include pressurizing the bellows within a threshold time. The threshold time may be a fixed value (e.g., 3 seconds, 5 seconds, 10 seconds, 20 seconds, or other duration of time) or a dynamic value based on one or more of current elevation, current vehicle speed, expected elevation change, amount of fuel provided during refueling event, time elapsed since the refueling event, time since last purge, canister load, and the like.

At 516, the method 500 may include closing V1 and maintaining V2 open. In this way, the bellows are sealed and maintain the pressurization while the open V2 may permit communication between the ELCM and the canister. In this way, positive pressure may continue to be directed to the canister.

At 518, the method 500 may include opening the FTIV at the end of the descent. During the descent, the change in elevation may generate a vacuum within the fuel tank due to differential pressure changes via decreasing elevation. Opening the FTIV at the end of the descent may increase the amount of vacuum generated in the fuel tank, wherein the vacuum may draw vapors from the canister to the fuel tank.

At 520, the method 500 may include closing the FTIV and opening V1 in response to the fuel tank vacuum being less than or equal to a threshold vacuum. In one example, the threshold vacuum is zero. As such, the vacuum in the fuel tank may be completely consumed when the FTIV is closed.

Returning to 508, if reverse purging conditions are not met, which may be due to a refueling event not being executed prior to the all-electric mode, the all-electric mode not being executed following the refueling event, a descent not occurring, and/or a refueling event not yet being then the method 500 proceeds to 522 of FIG. 5B, which may include determining if a vehicle is being shipped. The vehicle is being shipped if the vehicle is shut-off while a location of the vehicle is changing. Vehicle shipping may include the vehicle being towed, in one example.

If the vehicle is being shipped, then at 524, the method 500 may include operating the ELCM in a vacuum mode. As such, vacuum is provided to the vent line.

At 526, the method 500 may include opening V1 and V2. In some examples, V1 and V2 may already be open.

At 528, the method 500 may include flowing vacuum to the bellows. The pressure within the bellows may decrease, resulting in the bellows contracting and decreasing in size.

At 530, the method 500 may include closing V1 and maintaining V2 open. As such, the ELCM may maintain communication with a canister while the bellows are sealed and retain the vacuum therein. By contracting the bellows during transportation/shipping of the vehicle, the bellows may be less likely to degrade due to unexpected stresses such as high G-forces and pitch angles. If the bellows is expanded and experiences the stresses, the bellows may degrade (e.g., develop a leak due to a tear or the like). When V1 is closed and the bellows are collapsed, the bellows may be locked in place and unable to expand.

At 532, the method 500 may include opening V1 once the vehicle arrives at a final destination. By opening V1, the bellows may communicate with atmosphere, resulting in an expansion thereof.

Returning to 522, if the vehicle is not being shipped, then at 534, the method 500 includes where actuation of the bellows is desired due to a refueling event occurring or a refueling event about to begin.

At 536, the method 500 may include determining if a bellows temperature is less than a threshold temperature. The threshold temperature may be based on a temperature at which a plasticity of the bellows decreases, resulting in the bellows becoming more rigid. If the bellows is more rigid, a reaction time (e.g., a time in which the bellows response to fuel tank pressures and at least partially collapses) of the bellows may be reduced. This may result in a premature shut-off of a fuel pump due to a fuel level being inaccurately sensed at 100%. In some examples, only certain fuel pumps with relatively high fuel dispense rates may be prone to the premature refueling shut-off due to the bellows being more rigid. Thus, in some examples of the method 500, determination of the bellows temperature may be combined with determination of a fuel pump rate at a fuel station at which the vehicle is refueling. The fuel pump rate may be determined based on previous refueling times at the fuel station. Additionally or alternatively, other vehicles that have refueled at the refueling station may provide the fuel pump rate via wireless communication. The bellows temperature may be determined based on an ambient temperature, a fuel tank temperature, and a fuel tank pressure.

At 538, the method 500 may include operating the ELCM in a vacuum mode, similar to 524.

At 540, the method 500 may include opening V1 and V2, similar to 526.

At 542, the method 500 may include flowing vacuum to the bellows, similar to 528.

At 544, the method 500 may include closing V1 and maintaining V2 open, similar to 530. By pre-positioning the bellows in the collapsed position prior to refueling or during a beginning of refueling, a likelihood of premature refueling shut-off is reduced.

At 546, the method 500 may include opening V1 once refueling is complete. As such, the bellows may expand.

Returning to 536, if the bellows temperature is not less than the threshold temperature, or if the fuel pump rate is less than a threshold rate, then the method 500 may proceed to 548 of FIG. 5C, which includes determining actuation of the bellows is desired to limit a fueling of the fuel tank. Fuel limiting may be desired if a fuel tank capacity is greater than a desired capacity or if a customer requests less than a full fuel tank fill up. The fuel tank capacity may be greater than the desired capacity due to a single fuel tank configuration being used across multiple vehicle models by a manufacturer. For example, full hybrid electric vehicles (FHEVs) may use a larger volume fuel tank than plug-in hybrid electric vehicles (PHEVs). By using a single tank for both FHEVs and PHEVs, research and manufacturing costs for the manufacturer may be reduced. To accommodate the lower fuel capacity of the PHEV with the oversized fuel tank, the bellows may be pressurized during refueling to reduce a total fuel tank volume. Additionally or alternatively, the vehicle operator may input, via a navigation system or an infotainment system, a request to partially fill the fuel tank. As such, the bellows may be pressurized according to the volume of the partial fill request.

Additionally or alternatively, fuel limiting may be desired if a quality of fuel at the fuel station is less than a threshold quality. The quality of fuel may be determined based on feedback from other vehicles that received fuel from the fuel station. The threshold quality may be based on an octane rating, water content, ethanol content, and the like. In one example, the vehicle operator may be notified that fuel limiting is activated at the fuel station. A request for refueling at another fuel station with higher quality fuel may be sent and/or displayed to the vehicle operator via text, email, prompt on a display device of the vehicle, or the like.

At 550, the method 500 may include opening V1 and V2. As such, the bellows are fluidly coupled to the vent line.

At 552, the method 500 may include pressurizing the bellows prior to the refueling event. In one example, the pressurization of the bellows is proportional to a difference between the full fuel tank and a requested fill volume. The requested fill volume may be input by the vehicle operator or a fixed value equal to the total volume and a capacity set by the manufacturer based on the vehicle model. If the fuel limiting is selected due to poor fuel quality, then the amount of pressurization may be based on a distance to a fuel station with higher quality fuel or a lowest fill volume of the fuel tank controllable by the bellows.

At 554, the method 500 may include opening V2 and maintaining V1 closed. The pressure within the bellows may be maintained and the ELCM may communicate with the canister.

At 556, the method 500 may include opening FTIV at a start of refueling. The start of refueling may be indicated by the fuel pump dispensing fuel into the fuel tank. Vapors from the fuel tank may flow through the open FTIV to the canister for vehicles equipped with onboard vapor capture.

At 558, the method 500 may include closing the FTIV and opening V1 at the end of refueling. Fuel vapors from the fuel tank may no longer flow to the canister and the bellows may contract.

In one embodiment, additionally or alternatively, a method may include actively adjusting a volume of the bellows in response to a volume of the bellows being less than a desired volume. The desired volume may be based on equation 1 below:

$$DBV = Tv \times \left[1 - \frac{Bp - Maxvp}{BP - Minvp}\right]$$ equation 1

DBV represents desired bellows volume, Tv represents tank volume, Bp represents barometric pressure, Maxvp represents a maximum vapor pressure, and Minvp represents a minimum vapor pressure. If the bellows volume is not equal to the desired bellows volume, then the pump of the ELCM may be activated to actively adjust the volume of the bellows. For example, if the volume of the bellows is too low, then the pump may be activated in a pressure mode to increase the bellows volume. If the volume of the bellows is too high, then the pump may be activated in a vacuum mode to decrease the bellows volume. In some examples, the bellows volume may not match the desired bellows volume in response to altitude changes, low or high fuel volumes, high barometric pressures, low or high ambient temperatures, and a leak in the bellows.

Turning now to FIG. 6, it shows a graph 600 illustrating engine operating parameters during a reverse purging event. As described above, the reverse purging event may be initiated during an all-electric vehicle operation following a fuel tank fill up. Vapors stored in the canister may be prone to releasing to atmosphere during the all-electric vehicle operation due to a lack of purge. The reverse purging may utilize a vacuum generated in the fuel tank during a vehicle descent to draw vapors from the canister during the all-electric vehicle operation to prevent the vapors from flowing to atmosphere.

Plot 610 illustrates if a vehicle is descending. Plot 620 illustrates an operation of the ELCM. Plot 630 illustrates a V1 position. Plot 640 illustrates a V2 position. Plot 650 illustrates a FTIV position. Plot 660 illustrates a bellow volume. Plot 670 illustrates a canister load. Time increases from a left to a right side of the figure.

Prior to t1, the vehicle is not descending. However, a drive path is previewed and it is determined that the vehicle will descend within threshold time. As such, the bellows may be expanded via the ELCM operating in a pressurization mode. Pressurized gases flow to an interior of the bellows via V1 and V2 being in open positions to fluidly couple the interior of the bellows to a vent line.

At t1, the vehicle begins to descent. V1 is closed to seal the pressure therein and the bellows are expanded. The FTIV is opened to fluidly couple the fuel tank to the canister. Between t1 and t2, the vapors in the canister are drawn to the fuel tank, which reduces a load of the canister.

At t2, the vehicle is no longer descending. The FTIV is closed and the V1 is opened. After t2, the bellows begin to contract as the pressure in the fuel tank presses against the bellows. The canister load remains relatively low as fuel vapors are trapped in the fuel tank until the engine is activated.

The disclosure provides support for a method including operating a pump of an evaporative leak detection module (ELCM) of an evaporative emissions control (EVAP) system to adjust a volume of a bellows within a fuel tank outside of a diagnostic. A first example of the method further includes where the pump is operated to increase the volume of the bellows in response to a vehicle approaching a descent. A second example of the method, optionally including the first example, further includes where the pump is operated to decrease the volume of the bellows in response to fuel limiting being desired. A third example of the method, optionally including one or more of the previous examples, further includes where fuel limiting is desired in response to a user request, a capacity of the fuel tank being greater than a desired capacity, and a fuel quality at a refueling station being less than a threshold quality. A fourth example of the method, optionally including one or more of the previous examples, further includes where the pump is operated to decrease the volume of the bellows in response to the vehicle being transported while the vehicle is shut-off. A fifth example of the method, optionally including one or more of the previous examples, further includes where the pump is operated to decrease the volume of the bellows in response to a temperature of the bellows being greater than a threshold temperature during a refueling event. A sixth example of the method, optionally including one or more of the previous examples, further includes a rate of a fuel pump being greater than a threshold rate.

The disclosure further provides support for a system including a fuel system coupled to an engine, the fuel system comprising a fuel tank, an evaporative emissions control (EVAP) system comprising an evaporative leak detection module (ELCM), the EVAP system coupled to the engine, a bellows arranged in the fuel tank, the bellows configured to expand or contract in response to a fuel tank pressure or to operation of a pump of the ELCM, wherein an interior of the bellows is coupled to a vent line in which the ELCM is arranged via a vapor line, and a controller comprising computer-readable instructions of non-transitory memory thereof that when executed cause the controller to activate the pump outside of a diagnostic of the bellows, open a first valve and a second valve arranged in the vapor line, and adjust a pressure within the bellows. A first example of the system further includes where the second valve is a canister vent valve. A second example of the system, optionally including the first example, further includes where the instructions further cause the controller to operate the pump in a pressure mode to expand the bellows via increasing the pressure of the interior of the bellows in response to a refueling event followed by an all-electric operation of a vehicle in which the engine is arranged to execute a reverse purging. A third example of the system, optionally including one or more of the previous examples, further includes where the instructions further cause the controller to preview a travel path and expand the bellows within a threshold duration of an upcoming descent. A fourth example of the system, optionally including one or more of the previous examples, further includes where the instructions further cause the controller to expand the bellows in response to a refueling event occurring or occurring within a threshold period, a fuel pump rate being greater than a threshold, and a fuel tank capacity being greater than a desired capacity. A fifth example of the system, optionally including one or more of the previous examples, further includes where the instructions further cause the controller to operate the pump in a vacuum mode to contract the bellows in response to a vehicle in which the engine is arranged being transported, wherein the vehicle is shut-off during transportation. A sixth example of the system, optionally including one or more of the previous examples, further includes where the instructions further cause the controller to operate the pump in a pressure mode in response to a temperature of the bellows being less than a threshold temperature during a refueling event. A seventh example of the system, optionally including one or more of the previous examples, further includes where the threshold temperature is based on a stiffness of the bellows.

The disclosure further provides support for a method for a hybrid vehicle including adjusting a pressure of an interior of a bellows in response to a refueling event via a pump of an evaporative leak control module (ELCM) arranged in an evaporative emission control (EVAP) system coupled to a fuel tank in which the bellows is arranged. A first example of the method further includes adjusting the pressure further comprises decreasing the pressure during the refueling event in response to a temperature of the bellows being greater than a threshold temperature via operating the pump in a vacuum mode. A second example of the method, optionally including the first example, further includes adjusting the pressure further comprises increasing the pressure after the refueling event and prior to an elevation change during an all-electric operation of the hybrid vehicle via operating the pump in a pressure mode. A third example of the method, optionally including one or more of the previous examples, further includes where adjusting the pressure further comprises increasing the pressure prior to the refueling event in response to a capacity of the fuel tank being greater than a desired capacity via operating the pump in a pressure mode. A fourth example of the method, optionally including one or more of the previous examples, further includes adjusting the pressure of the interior of the bellows in response to the hybrid vehicle being transported, wherein the hybrid vehicle is shut-off during transportation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
operating a pump of an evaporative leak detection module (ELCM) of an evaporative emissions control (EVAP) system to adjust a volume of a bellows within a fuel tank outside of a diagnostic.

2. The method of claim 1, wherein the pump is operated to increase the volume of the bellows in response to a vehicle approaching a descent.

3. The method of claim 1, wherein the pump is operated to decrease the volume of the bellows in response to fuel limiting being desired.

4. The method of claim 3, wherein fuel limiting is desired in response to a user request, a capacity of the fuel tank being greater than a desired capacity, and a fuel quality at a refueling station being less than a threshold quality.

5. The method of claim 1, wherein the pump is operated to decrease the volume of the bellows in response to the vehicle being transported while the vehicle is shut-off.

6. The method of claim 1, wherein the pump is operated to decrease the volume of the bellows in response to a temperature of the bellows being greater than a threshold temperature during a refueling event.

7. The method of claim 6, further comprising a rate of a fuel pump being greater than a threshold rate.

8. A system, comprising:
a fuel system coupled to an engine, the fuel system comprising a fuel tank;
an evaporative emissions control (EVAP) system comprising an evaporative leak detection module (ELCM), the EVAP system coupled to the engine;
a bellows arranged in the fuel tank, the bellows configured to expand or contract in response to a fuel tank pressure or to operation of a pump of the ELCM, wherein an interior of the bellows is coupled to a vent line in which the ELCM is arranged via a vapor line; and
a controller comprising computer-readable instructions of non-transitory memory thereof that when executed cause the controller to:
activate the pump outside of a diagnostic of the bellows;
open a first valve and a second valve arranged in the vapor line; and
adjust a pressure within the bellows.

9. The system of claim 8, wherein the second valve is a canister vent valve.

10. The system of claim 8, wherein the instructions further cause the controller to operate the pump in a pressure mode to expand the bellows via increasing the pressure of the interior of the bellows in response to a refueling event followed by an all-electric operation of a vehicle in which the engine is arranged to execute a reverse purging.

11. The system of claim 10, wherein the instructions further cause the controller to preview a travel path and expand the bellows within a threshold duration of an upcoming descent.

12. The system of claim 8, wherein the instructions further cause the controller to expand the bellows in response to a refueling event occurring or occurring within a threshold period, a fuel pump rate being greater than a threshold, and a fuel tank capacity being greater than a desired capacity.

13. The system of claim 8, wherein the instructions further cause the controller to operate the pump in a vacuum mode to contract the bellows in response to a vehicle in which the engine is arranged being transported, wherein the vehicle is shut-off during transportation.

14. The system of claim 8, wherein the instructions further cause the controller to operate the pump in a pressure mode in response to a temperature of the bellows being less than a threshold temperature during a refueling event.

15. The system of claim 8, wherein the threshold temperature is based on a stiffness of the bellows.

16. A method for a hybrid vehicle, comprising:
adjusting a pressure of an interior of a bellows in response to a refueling event via a pump of an evaporative leak control module (ELCM) arranged in an evaporative emission control (EVAP) system coupled to a fuel tank in which the bellows is arranged.

17. The method of claim 16, wherein adjusting the pressure further comprises decreasing the pressure during the refueling event in response to a temperature of the bellows being greater than a threshold temperature via operating the pump in a vacuum mode.

18. The method of claim 16, wherein adjusting the pressure further comprises increasing the pressure after the refueling event and prior to an elevation change during an all-electric operation of the hybrid vehicle via operating the pump in a pressure mode.

19. The method of claim 16, wherein adjusting the pressure further comprises increasing the pressure prior to the refueling event in response to a capacity of the fuel tank being greater than a desired capacity via operating the pump in a pressure mode.

20. The method of claim 16, further comprising adjusting the pressure of the interior of the bellows in response to the hybrid vehicle being transported, wherein the hybrid vehicle is shut-off during transportation.

* * * * *